United States Patent [19]

Inaba et al.

[11] 4,416,577
[45] Nov. 22, 1983

[54] ROBOT HAND OF AN INDUSTRIAL ROBOT

[75] Inventors: Hajimu Inaba, Hino; Ryo Nihei, Musashino, both of Japan

[73] Assignee: Fujitsu Fanuc Limited, Tokyo, Japan

[21] Appl. No.: 288,284

[22] Filed: Jul. 30, 1981

[30] Foreign Application Priority Data

Aug. 6, 1980 [JP] Japan .................................. 55/107077

[51] Int. Cl.³ ............................................ B65H 29/06
[52] U.S. Cl. ..................................... 414/226; 15/304; 29/568; 409/137; 414/736
[58] Field of Search ............... 414/732, 736, 738, 739, 414/225, 226; 408/68, 67, 56; 409/137, 232; 29/568; 82/2.5, 2.7; 15/304; 294/66 R, 86 R

[56] References Cited

U.S. PATENT DOCUMENTS

| 3,028,020 | 4/1962 | Peras ................................ 414/736 X |
| 3,443,310 | 5/1969 | Burroughs et al. .................... 29/568 |
| 4,151,918 | 5/1979 | Nakane ................................ 414/736 |
| 4,302,144 | 11/1981 | Hallqvist ............................. 414/590 |
| 4,318,665 | 3/1982 | Carroll et al. ..................... 29/568 X |

Primary Examiner—Leslie J. Paperner
Assistant Examiner—Donald W. Underwood
Attorney, Agent, or Firm—Armstrong, Nikaido, Marmelstein & Kubovcik

[57] ABSTRACT

A robot hand provided for an industrial robot used in association with a machine tool for carrying out a manipulating operation of attaching a workpiece to and detaching a workpiece from a workpiece chucking means of the machine tool, said robot hand being characterized by including means for removing chips and other foreign materials attached to the workpiece holding means during the manipulating operation.

10 Claims, 4 Drawing Figures

ROBOT HAND OF AN INDUSTRIAL ROBOT

BACKGROUND OF THE INVENTION

The present invention relates generally to an industrial robot adapted to be used in association with a machine tool, and more particularly to a robot hand of an industrial robot, which hand is provided with means for removing chips or other foreign materials attached to a workpiece holder of a machine tool or workpiece, per se.

Generally, the industrial robot is employed as an industrial manipulating device used in association with diverse kinds of machines and apparatuses for the purpose of automatically transferring an article to and from the machines and the apparatuses. The automatic manipulating operation of the industrial robot is always controlled by a robot controller, to which the instruction data for the robot operation are preliminarily given. When the industrial robot is used in association with an automatic machine tool, such as a numerically controlled machine tool, the industrial robot is employed for the automatic transferring of a workpiece between a given workpiece station and the machine tool and for attaching the workpiece to and detaching the workpiece from a chucking device of the machine tool or a holding jig of the machine tool. The employment of the industrial robot can highly contribute to promoting the efficiency of the operation of the automatic machine tool. At this stage, it should be understood that when a workpiece is attached to the chuck device or the holding jig by the industrial robot, all chips and other foreign materials attached to the chucking device or the holding device, the workpiece, and the robot hand should be removed in order that the workpiece is rigidly and accurately held by the chucking device or the holding jig. That is, the cleaning of the chucking device or the holding jig of the machine tool, as well as the cleaning of the workpiece and the robot hand, are indispensable for the accurate and rigid holding of the workpiece by the chucking device or the holding jig. For this reason, conventional machine tools are provided with a cleaning means which uses pressurized air or a cooling liquid as a cleaning agent for removing chips and other foreign materials attached to the chucking device or the holding jig. When the cleaning operation is carried out, the robot hand of the industrial robot must be moved away from the chucking device or the holding jig, since the cleaning agent is blown by the cleaning means toward the chucking device or the holding jig so that the chips are blown free of the chucking device or the holding jig. Otherwise, the blown chips might become attached to the robot hand. After the cleaning operation of the machine tool, the robot hand must again be brought close to the chucking device or the holding device. Accordingly, the efficiency of the industrial robot is rather low. Particularly in the case where the industrial robot is provided with a particular robot hand having two sets of graspers for the purpose of shortening the time required for attaching a workpiece to and detaching a workpiece from the machine tool, the above-mentioned low efficiency of the industrial robot is quite disadvantageous.

SUMMARY OF THE INVENTION

An object of the present invention is, therefore, to eliminate the disadvantages encountered when a conventional industrial robot is used in association with a conventional automatic machine tool.

Another object of the present invention is to provide a robot hand of an industrial robot, which hand per se is provided with a chip-removing means, whereby the cleaning of a chucking device or a holding jig, as well as the cleaning of a workpiece, is successively carried out during the robot manipulating operation of the industrial robot without moving the robot hand away from the chucking device or the holding jig of the machine tool.

In accordance with the present invention, there is provided a robot hand of an industrial robot which is used in association with a machine tool for carrying out a manipulating operation of attaching a workpiece to and detaching a workpiece from a workpiece holding means of the machine tool, said robot hand is characterized by comprising two sets of grasper means arranged side by side, each grasper means having a finger assembly for grasping a workpiece therein, and means for removing chips and other foreign materials attached to said workpiece holding means of said machine tool while said manipulating operation of said robot hand is carried out.

DESCRIPTION OF THE DRAWINGS

The above and other objects and features of the present invention will become apparent from the ensuing description of an embodiment with reference to the accompanying drawings, wherein.

DETAILED DESCRIPTION OF THE INVENTION

Figure 1:
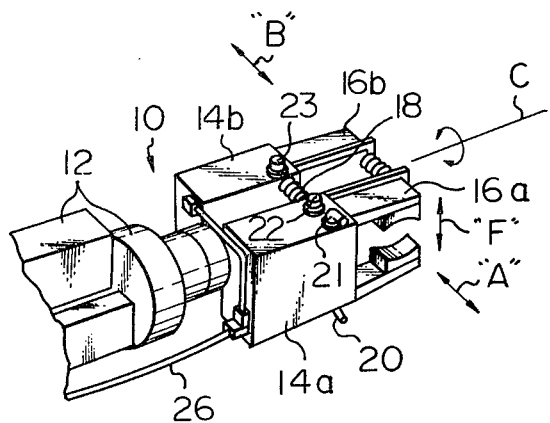
FIG. 1 is a partial perspective view of a robot hand with a chip removing means, according to the present invention.
Figure 2:
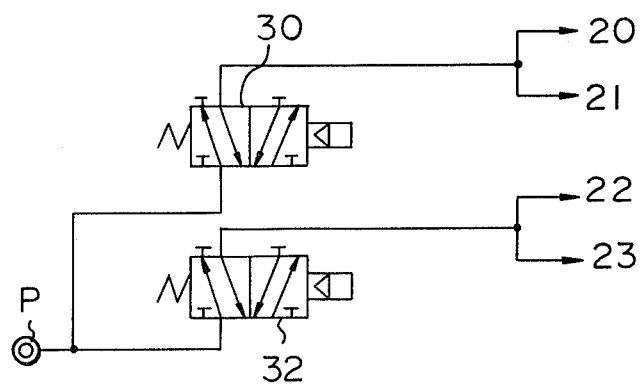
FIG. 2 is a circuit diagram of a pneumatic chip removing means in the case where the chip removing means employs pressurized air as a cleaning agent.
Figure 3:
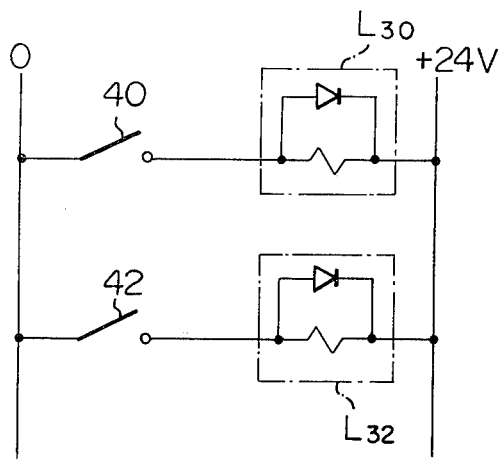
FIG. 3 is an example of a control circuit diagram for controlling the operation of a chip removing means of the robot hand according to the present invention.

Referring to FIG. 1, a robot hand 10, which is connected to a robot wrist 12 of an industrial robot, is provided with two sets of graspers 14a and 14b arranged side by side. The grasper 14a has a finger assembly 16a including two fingers moving toward and away from one another in the direction of an arrow "F". The grasper 14b has a similar finger assembly 16b. The graspers 14a and 14b are structured so that each of the graspers 14a and 14b can carry out the grasping operation independently from the other. Further, as already described, since the two graspers 14a and 14b are arranged side by side, when a workpiece should be introduced into or removed from the fingers of the grasper 14a, the robot hand 10 together with the robot wrist 12, are moved in the direction shown by an arrow "A", while when a workpiece should be introduced into or removed from the fingers of the grasper 14b, the robot hand 10, together with the robot wrist 12, are moved in the direction shown by an arrow "B". The graspers 14a and 14b can concurrently turn about an axis "C" in both directions with respect to the robot wrist 12. The robot wrist 12 is connected, at its rear end opposite to the end connected to the robot hand 10, to a robot arm (not illustrated in FIG. 1). Further, the robot arm is capable of telescopically moving forward and back in the direction corresponding to the axis "C", so that the two graspers 14a and 14b are also able to move forward and backward in the same direction as the robot arm. Moreover, the robot arm is structured, in the conventional manner, so that it is able to not only turn about a robot body (not shown) but also to move up and down with respect to the robot body. In FIG. 1, springs of a conventional pressure mechanism to be arranged between the two graspers 14a and 14b are designated by a reference numeral 18. In accordance with the present invention, the two graspers 14a and 14b of the robot hand 10 are provided with air ejecting nozzles 20, 21, 22 and 23 to which pressurized air is supplied from a pressurized air source via an air conduit 26 and the pressurized air is further passed into air conduits incorporated in the two graspers 14a and 14b. The pressurized air ejected from the nozzles 20 through 23 is used for the chip removal operation described later. At this stage, it should be noted that the positions of these air ejecting nozzles 20 through 23 provided for the robot hand 10 should appropriately be chosen by taking the operations of the two graspers 14a and 14b, which operations are carried out for attaching a workpiece to and detaching a workpiece from a machine tool (not illustrated in FIG. 1), into consideration. For example, in some case, the air ejecting nozzles 20 through 23 may be provided for the bodies of the graspers 14a and 14b, and in another case, the nozzles 20 through 23 may be provided for the finger assemblies 16a and 16b. In the embodiment in FIG. 1, the nozzles 20 through 23 are arranged on the two side surfaces of the bodies of the two graspers 14a and 14b, each of which surfaces are at a right angle to the surface that is perpendicular to an axis parallel to the illustrated arrow "A". The two air ejecting nozzles 20 and 21 are arranged so that, as soon as a workpiece held by a chucking device of a machine tool is removed from the chucking device by the operation of the grasper 14a, the chucking device is cleaned by the pressurized air ejected from the two air ejecting nozzles 20 and 21 of the grasper 14a. On the other hand, the air ejecting nozzles 22 and 23 are arranged so that immediately before a workpiece grasped by the finger assembly 16b of the grasper 14b is attached to a chucking device of a machine tool by the operation of the robot hand 10, the chucking device is cleaned by the pressurized air ejected from the two air ejecting nozzles 22 and 23 of the grasper 14b. At this stage, it will be understood that the pressurized air ejected from the pair of the nozzles 20 and 21, as well as the other pressurized air ejected from the pair of the nozzles 22 and 23, is blown out in a generally outwardly lateral direction, respectively, with respect to the turning axis "C" of the robot hand 10. Further, the two pairs of the nozzles 20, 21 and 22, 23 are respectively arranged so that respective flows of the pressurized air are ejected so as to completely remove all chips and other foreign material attached to the surfaces and the corners of the chucking device of the machine tool when the respective graspers 14a and 14b are brought to a position adjacent to the chucking device. Preferably, or if necessary, the number of air ejecting nozzles to be provided for the robot hand 10 may be increased and arranged at appropriate positions so that the robot hand 10, as well as workpieces held by the finger assemblies 16a and 16b, are also cleaned by the pressurized air during the workpiece attaching and detaching operations of the robot hand 10. The pressurized air may be supplied continuously from the pressurized air source to the air ejecting nozzles 20 through 23, so that the cleaning air for removing chips and foreign materials is always ejected from the nozzles 20 through 23 while the robot hand 10 is attaching a workpiece to or detaching a workpiece from a machine tool. However, preferably, a common single pressurized air source should be employed for supplying both the pressurized cleaning air and a pressurized air for operating the finger assemblies 16a and 16b, since the finger assemblies 16a and 16b are conventionally operated by pressurized air. When a common single pressurized air source is employed, an electro-magnetic flow control valve or valves is arranged between the pressurized air source and the air ejecting nozzles 20 through 23, so that pressurized air is supplied from the pressurized air source to the air ejecting nozzles 20 through 23 only when the cleaning operation is in effect. FIG. 2 illustrates an example of the pressurized air circuit in which two electro-magnetic flow control valves 30 and 32 are arranged between the pressurized air source P and the two pairs of the air ejecting nozzles 20, 21 and 22, 23. The flow control valve 30 is used for controlling the supply of the pressurized air from the pressurized air source P to the nozzles 20 and 21, while the flow control valve 32 is used for controlling the supply of the pressurized air from the pressurized air source P to the nozzles 22 and 23. In FIG. 2, the two flow control valves 30 and 32 are both switched to positions so that neither the pair of the flow control valves 20, 21 nor the other pair of the flow control valves 22, 23 is supplied with the pressurized air from the source P. The switching of the individual flow control valves 30 and 32 can be controlled by the supply of electric command signals from, for example, the robot controller. If preferable, a given control means for supplying the above-mentioned electric command signals may be employed. FIG. 3 illustrates a case where the switching of the two electro-magnetic flow control valves 30 and 32 is controlled by a robot controller. In FIG. 3, when a switch 40 is closed in response to a command signal from the robot controller, a solenoid L30 of the electro-magnetic flow control valve 30 is switched from its closed position to its open position, so that the pressurized air is supplied from the air source P to the nozzles 20 and 21 (FIG. 2). Therefore, the pressurized cleaning air is ejected from the nozzles 20 and 21. When a switch 42 is closed in response to a command signal from the robot controller, a solenoid L32 of the electro-magnetic flow control valve 32 is switched from its closed position to its open position.

Figure 4:
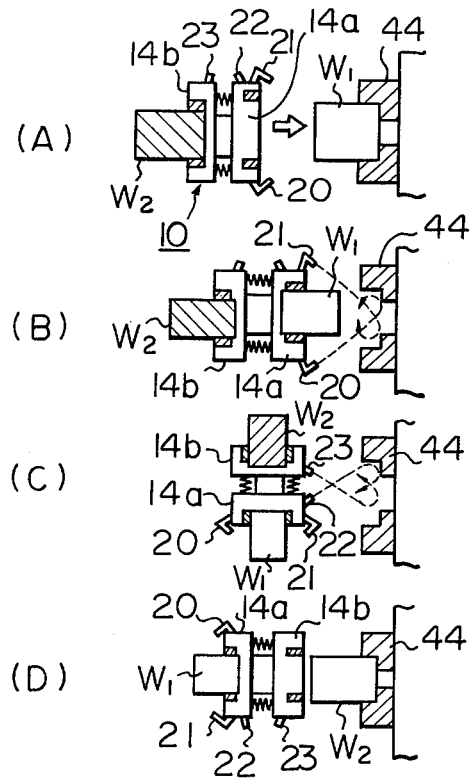
FIG. 4 is a diagrammatic view illustrating the operation of the robot hand of the present invention.

With the above-described robot hand 10 provided with a pneumatic means for removing chips and other foreign materials, an example of the successively conducted operations of the robot hand 10 from the step of detaching a machined workpiece from a chucking device of a machine tool to the step of attaching a raw workpiece to the chucking device will now be described hereinafter with reference to FIG. 4. Naturally, the successively conducted operations of the robot hand 10 include the chip-removal operation by the use of the pneumatic chip-removing means.

FIG. 4(A) illustrates a step in which the grasper 14a of the robot hand 10 starts to detach a machined workpiece W1 from a chucking device 44 of a machine tool. At this step, the other grasper 14b is grasping another raw workpiece W2, and the air ejecting nozzles 20 and 21 are ready for ejecting the pressurized cleaning air toward the inside of the chucking device 44. An arrow shown in FIG. 4(A) illustrates the direction in which the robot hand 10 moves for the purpose of detaching the workpiece W1 from the chucking device 44. After the detaching of the workpiece W1, the robot hand 10 moves back to a position shown in FIG. 4(B), where the robot hand 10 receiving the machined workpiece W1 in its graper 14a is ready to be turned about the axis "C" (FIG. 1). In the position shown in FIG. 4(B), when the pressurized air is ejected from the air ejecting nozzles 20 and 21 toward the chucking device 44, all chips and foreign materials attached to the inside surfaces and the corners of the chucking device 44 during the machining of the workpiece W1 are blown off by the ejected pressurized air. Therefore, the chucking device 44 is cleaned, so that the chucking device 44 becomes ready for rigidly and accurately holding another raw workpiece W2 to be subsequently machined. Thereafter, the robot hand 10 is turned 90 degrees until the position of the robot hand 10 shown in FIG. 4(C) is acquired. At the position of FIG. 4(C), the air ejecting nozzles 22 and 23 are ready for ejecting the pressurized air toward the chucking device 44. That is, the cleaning of the chucking device 44 is again achieved by the pressurized cleaning air ejected from the nozzles 22 and 23. After completion of the above-mentioned cleaning operation of the robot hand 10, the robot hand 10 is further turned 90 degrees until the grasper 14b grasping the workpiece W2 comes to be opposed to the chucking device 44. Subsequently, the workpiece W2 is attached to the cleaned chucking device 44 by the operation of the robot hand 10. FIG. 4(D) illustrates the state where the attaching of the workpiece W2 to the chucking device 44 is completed and where the robot hand 10 is moved away from the chucking device 44. At this stage, it should be understood that, since the chucking device 44 is completely cleaned immediately before the workpiece W2 is attached to the chucking device 44, the holding or chucking of the workpiece W2 by the chucking device 44 can be highly accurate without the intervention of any chips or other foreign materials between the workpiece W2 and the chucking device 44. Accordingly, the machining of the workpiece W2 can be accurately performed by the machine tool.

It should here be understood that if the robot hand 10 is provided with a separate means for cleaning the workpiece W2, the accurate chucking of the workpiece W2 will be further ensured.

From the foregoing description of the embodiment, it will be understood that, in accordance with the present invention, since a robot hand of an industrial robot is provided with means for removing any chips attached to a chucking device or a workpiece holding jig of a machine tool, the robot hand per se is capable of automatically cleaning the chucking device or the workpiece holding jig without assistance of the conventional chip-removing means provided for the machine tool. As a result, during the time the operation for attaching a workpiece to or detaching a workpiece from the machine tool is occurring, the cleaning operation for removing the chips and the foreign materials can be conducted without moving the robot hand far away from the machine tool. Consequently, it is possible to shorten the operation for attaching a workpiece to and detaching a workpiece from the machine tool compared with the conventional industrial robot.

In the foregoing embodiment, the pressurized air is employed as a cleaning agent for removing chips and other foreign materials. However, a variant embodiment may be adopted in which a liquid agent, such as a conventional cutting oil under pressure or a conventional cooling liquid under pressure, is employed as a cleaning agent.

I claim:

1. A robot hand provided for an industrial robot which is used in association with a machine tool for carrying out a manipulating operation of attaching a workpiece to and detaching a workpiece from a workpiece holding means of the machine tool, said robot hand comprising:
   two sets of grasper means arranged side by side, each grasper means having a finger assembly for grasping a workpiece therein, and
   means attached to grasper means for removing chips and other foreign materials attached to said workpiece holding means of said machine tool while said manipulating operation of said robot hand is carried out.

2. A robot hand as set forth in claim 1, wherein said chip-removing means comprises nozzle means for ejecting a pressurized fluid agent, and supply conduit means for supplying said pressurized fluid agent from a pressurized fluid agent source to said nozzle means.

3. A robot hand as set forth in claim 2, wherein said two sets of grasper means are arranged so as to be concurrently turnable about a common axis so that each of said two sets of grasper means alternately comes close to said workpiece holding means of said machine tool and wherein said nozzle means comprises at least a first pair of nozzles provided for one of said two sets of graspers at a given position so that when said one of said two sets of graspers is opposed to said workpiece holding means, said first pair of nozzles is capable of ejecting said pressurized fluid agent toward said workpiece holding means.

4. A robot hand as set forth in claim 3, wherein said nozzle means comprises a second pair of nozzles capable of ejecting said pressurized fluid agent toward said workpiece holding means when said one of said two sets of grasper means is turned 90 degrees from the position that said one of said two sets of grasper means is opposed to said workpiece holding means.

5. A robot hand as set forth in claim 2, wherein said supply conduit means comprise at least an electro-magnetic flow control valve for controlling the supply of said pressurized fluid agent from said pressurized fluid agent source to said nozzle means.

6. A robot hand for an industrial robot which is used in association with a machine tool for carrying out a manipulating operation of attaching a workpiece to and detaching a workpiece from a workpiece holding means of the machine tool, said robot hand comprising:
   two sets of grasper means arranged side by side, each grasper means having a finger assembly for grasping a workpiece therein;
   nozzle means projecting from said grasper means for ejecting a pressurized fluid agent to remove chips and other foreign materials attached to said workpiece holding means of said machine tool while said manipulating operation of said robot hand is carried out; and
   supply conduit means for supplying said pressurized fluid agent from a pressurized fluid agent source to said nozzle means.

7. A robot hand as set forth in claim 6, wherein said two sets of grasper means are arranged so as to be concurrently turnable about a common axis so that each of said two sets of grasper means alternately comes close to said workpiece holding means of said machine tool and wherein said nozzle means comprises at least a first pair of nozzles arranged so that when said one of said two sets of graspers is opposed to said workpiece holding means, said first pair of nozzles is capable of ejecting said pressurized fluid agent toward said workpiece holding means.

8. A robot hand as set forth in claim 7, wherein said nozzle means comprises a second pair of nozzles capable of ejecting said pressurized fluid agent toward said workpiece holding means when said one of said two sets of grasper means is turned 90 degrees from the position in which said one of said two sets of grasper means is opposed to said workpiece holding means.

9. A robot hand as set forth in claim 6, wherein said supply conduit means comprises at least an electromagnetic flow control valve for controlling the supply of said pressurized fluid agent from said pressurized fluid agent source to said nozzle means.

10. A robot hand as set forth in claim 6, wherein said pressurized fluid agent is pressurized air supplied from an air supply source.

* * * * *